Nov. 1, 1955    E. L. ABRASSART    2,722,075
DUCK RETRIEVING DEVICE
Filed July 12, 1954
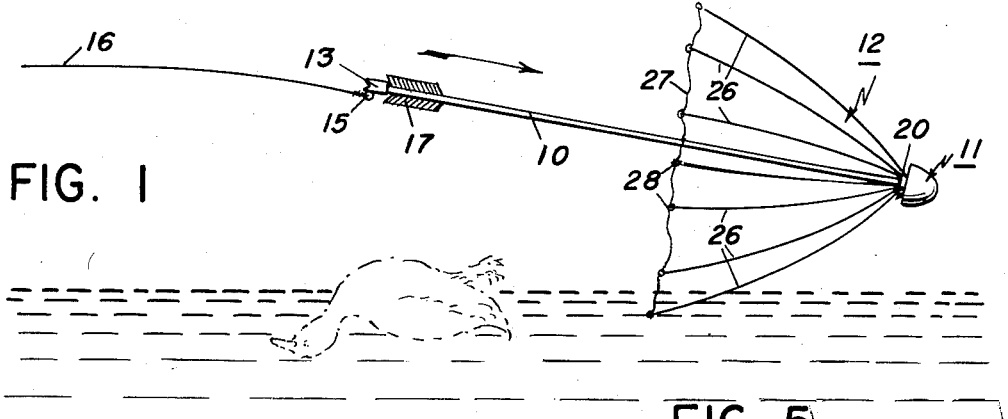
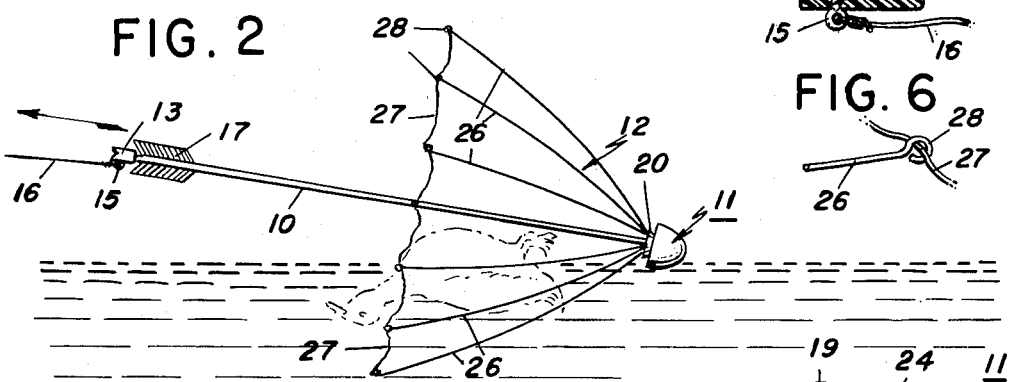
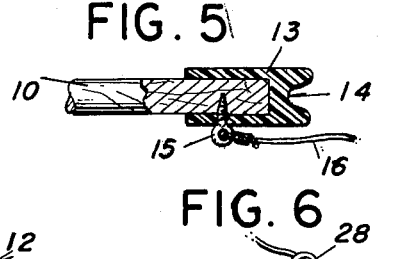
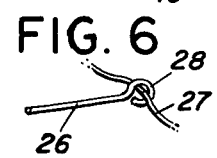
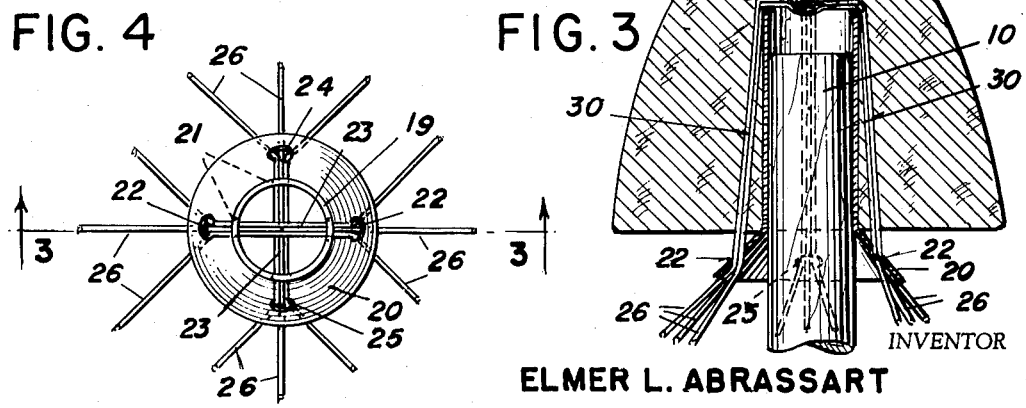
INVENTOR
ELMER L. ABRASSART
BY
*H. B. Willson & Co.*
ATTORNEYS

United States Patent Office 2,722,075
Patented Nov. 1, 1955

2,722,075
DUCK RETRIEVING DEVICE
Elmer L. Abrassart, Vincennes, Ind.
Application July 12, 1954, Serial No. 442,818
7 Claims. (Cl. 43—1)

This invention relates to devices used by hunters to retrieve ducks and other waterfowl shot down on rivers, lakes or other bodies of water.

It is well known that during each gunning season there is a great wastage of waterfowl because many birds that are killed or crippled are not recovered by the hunters shooting them. They frequently fall in deep water and the hunter has no means of reaching them. In the past it has been proposed to recover such birds by throwing a drag device on a retrieving line beyond the fallen duck and then manipulating the line to cause the drag to engage the floating duck so that it can be pulled to the blind or the shore by pulling in the line. The principal object of the invention is to provide an improved drag or retrieving device of this general character.

Another object of the invention is to provide a retrieving device of this character which is extremely light in weight while being at the same time strong and sturdy in use, and which may be projected by a propelling means to a much greater distance and with greater accuracy than prior art devices that were thrown by hand or by a casting rod.

Another object is to provide a device of this character which somewhat resembles an arrow since it comprises a straight shaft of wood or other buoyant material, an enlarged cone-shaped head at its front end made of cork or the like, and guiding feathers at its rear end, the head carrying a relatively large, duck-receiving cone-shaped frame composed of fine resilient wires which diverge rearwardly from the head in an annular series and have their extremities connected by a flexible strand so that the large rear end of the cone-shaped frame is open to readily receive a floating duck as the device is pulling in by a line attached to the rear end of the shaft.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a diagrammatic perspective view showing the device as it is projected beyond a duck to be retrieved;

Fig. 2 is a similar view showing the duck being retrieved;

Fig. 3 is an enlarged detail longitudinal section through the head and associated parts;

Fig. 4 is a detail end view of the metal sleeve and showing the arrangement of the steel wires therein;

Fig. 5 is an enlarged detail section through the rear portion of the shaft and the associated parts; and Fig. 6 is a detail perspective view of the rear end of one of the steel wires and a portion of the strand or line which connects the wires.

Referring more in detail to the drawings, the numeral 10 denotes a straight shaft of buoyant material such as cedar or other lightweight wood or even solid or tubular plastic material. The front end of this body or shaft 10 carries a buoyant head 11 from which extends in a rearward direction an open-work frame 12, the latter being substantially cone-shaped and disposed around at least the forward portion of the shaft. At its rear end the shaft is reduced, as seen in Fig. 5, to receive the tubular rear portion of a tip or sleeve 13 of plastic or other lightweight material. The rear end of the tip 13 has a transverse notch 14 to be engaged by a projecting element of a suitable propelling means. The tip may be fastened to the shaft by a screw eye 15 to which is tied a flexible retrieving line 16. The latter may be a suitable length of fishing line of any material; and its other end is anchored to the propelling means or at a point adjacent the user. On the shaft adjacent the rear tip are guiding feathers 17 similar to those used on arrows projected by bows in the sport of archery. There are three equally spaced longitudinal rows of radially projecting feathers. If the shaft is made of wood it is preferably given a waterproof coating of paint or the like.

The head 11 comprises a pointed or substantially cone-shaped body 18 of cork or other buoyant material and a coaxial sleeve 19 of aluminum or other lightweight metal. This thin metal sleeve has a bore to snugly telescope over the front end of the shaft 10, and it extends from a point adjacent the small front end of the body 18 to a point slightly beyond the flat rear end of the latter. On the projecting end of the cylindrical portion of the sleeve is an annular flange 20 which projects rearwardly at about a 45° angle. This sleeve serves to anchor the mid-portions of a plurality of groups or sets of fine resilient steel wires, the end portions of which form the duck-receiving pocket or frame 12. As will be seen on reference to Figs. 3 and 4, I preferably use six of the long wires arranged in two groups of three. Adjacent the forward end of the cylindrical sleeve 19 are formed diametrically opposed openings 21, and in the same longitudinal plane similar opposed opening 22 is formed in the flange 20. One group of three wires is passed through the alined holes 21 until their mid-portions 23 extend across the sleeve. The projecting ends of these wires are then bent rearwardly at right angles and passed through the holes 22 as shown in Fig. 3. The other group of wires are similarly anchored to the sleeve by being passed first through holes 24 near the end of the sleeve and then through holes 25 in the flange, the holes 24 and 25 being spaced 90° from the holes 21 and 23. The end portions 26 of all of the wires projecting from the holes 22 and 25 are then bent outwardly and rearwardly so that they will diverge from each other and be about equally spaced to form the cone-shape pocket or frame 12. Each of the long pieces of wire will form two of the end portions or ribs 26. The latter are preferably about 16" long so that the large rear end of the frame 12 will have a diameter of about 23". To hold these ribs or arms 26 in spaced relation a flexible cord or strand 27 such as a piece of fishing line is passed through and/or fastened to an eye 28 at the extremity of each of the ribs or arms 26, as will be understood on reference to Fig. 6. The portions 30 of all of the wires between the holes in the end of the sleeve and the holes in the flange will extend along the exterior of the sleeve 19 and when the latter is forced into the bore of the cork head 18, will be pressed into the cork to aid in securely fastening these parts together. The wires forming the frame 12 are preferably of about 1/32" diameter so that the frame will offer very little resistance to its movement through the air and will be very light in weight. With the shaft 10 made of a cedar rod 11/32" in diameter and 28" long and with the cork head 18 having a base diameter of 1½", the entire device will weigh only a little over 2 ounces. It will float on water with a portion of the wire frame beneath the surface so that it is easy to get the floating duck into the frame.

The device is shot or projected in line with the duck and beyond it, as will be understood upon reference to Fig. 1. The anchor line 16 is then pulled in as indicated in Fig. 2, the pressure or resistance of the water keeping the duck in the frame or pocket. When the device is not in use, the highly resilient wires 26 may be sprung close to the shaft and fastened by a surrounding cord or band in a compact bundle; or if desired the entire device may be telescoped into a cylindrical tube or casing having an internal diameter of about 2½". In practice it has been found that the device may be very accurately projected to much greater distances than prior drags can be thrown by hand.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A hunter's waterfowl retriever to be projected by a propelling means comprising a straight shaft of buoyant material having an anchor line attached to its rear, a forwardly tapered head of buoyant material at the front end of said shaft, and a generally cone-shaped fowl receiving frame surrounding the front portion of said shaft in rear of said head, said frame including a radial series of fine resilient wires each diverging from its adjacent wire and extending rearwardly and outwardly, and a flexible annular line connecting the free ends of said wires.

2. The structure of claim 1 in which the free ends of said wires are formed with eyes which receive said connecting line.

3. The structure of claim 1 in which said shaft has at its rear end a transversely notched tip to be engaged by a propelling means, and guiding feathers on said shaft adjacent said rear tip.

4. The structure of claim 1 in which said wires are fastened to said head and extend from the rear end thereof.

5. The structure of claim 1 in which said head comprises a substantially cone-shaped body of buoyant material having an axial bore opening through its large rear end, and a cylindrical sleeve in said bore and telescoped over the front end of said shaft, said wires being anchored to said sleeve.

6. The structure of claim 5 in which the front end of said sleeve has transverse openings and its rear end projects beyond the rear end of said cone-shaped body and carries an annular flange which projects outwardly and rearwardly and has openings corresponding in number to those at the front portion of the sleeve, and in which said resilient wires are formed by the end portions of long pieces of wire the central portions of which extend through said transverse openings at the front of the sleeve and are then bent to extend along the exterior of the sleeve and through said opening in the flange to anchor the wires to said sleeve.

7. The structure of claim 6 in which said transverse openings in the sleeve and said openings in the flange are arranged in spaced longitudinal planes around the axis of the device and in which said long wires are arranged in groups to dispose a plurality of wires in each of the longitudinally alined series of said openings.

References Cited in the file of this patent

UNITED STATES PATENTS

| 1,339,697 | England | May 11, 1920 |
| 2,058,709 | Molinare | Oct. 27, 1936 |
| 2,289,284 | Chandler | July 7, 1942 |
| 2,586,003 | Caslor | Feb. 19, 1952 |
| 2,629,600 | Edmonds | Feb. 24, 1953 |

FOREIGN PATENTS

| 562,721 | Great Britain | July 13, 1954 |